US008773599B2

(12) United States Patent
Saeedi et al.

(10) Patent No.: US 8,773,599 B2
(45) Date of Patent: Jul. 8, 2014

(54) NEAR-TO-EYE DISPLAY WITH DIFFRACTION GRATING THAT BENDS AND FOCUSES LIGHT

(75) Inventors: Ehsan Saeedi, Santa Clara, CA (US); Babak Amirparviz, Mountain View, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 135 days.

(21) Appl. No.: 13/280,218

(22) Filed: Oct. 24, 2011

(65) Prior Publication Data

US 2013/0100362 A1    Apr. 25, 2013

(51) Int. Cl.
*G02F 1/1335* (2006.01)

(52) U.S. Cl.
USPC ............. 349/11; 349/5; 359/630; 359/566

(58) Field of Classification Search
USPC .............. 349/5, 11, 13; 359/13, 630, 558, 359/566–576, 742
See application file for complete search history.

(56) References Cited

U.S. PATENT DOCUMENTS

| 4,711,512 | A  | 12/1987 | Upatnieks |
| 5,076,664 | A  | 12/1991 | Migozzi |
| 5,224,198 | A  | 6/1993  | Jachimowicz et al. |
| 5,715,337 | A  | 2/1998  | Spitzer et al. |
| 5,886,822 | A  | 3/1999  | Spitzer |
| 5,943,171 | A  | 8/1999  | Budd et al. |
| 6,023,372 | A  | 2/2000  | Spitzer et al. |
| 6,091,546 | A  | 7/2000  | Spitzer |
| 6,201,629 | B1 | 3/2001  | McClelland et al. |
| 6,204,974 | B1 | 3/2001  | Spitzer |
| 6,349,001 | B1 | 2/2002  | Spitzer |
| 6,353,492 | B2 | 3/2002  | McClelland et al. |
| 6,353,503 | B1 | 3/2002  | Spitzer et al. |
| 6,356,392 | B1 | 3/2002  | Spitzer |
| 6,384,982 | B1 | 5/2002  | Spitzer |
| 6,457,828 | B1 * | 10/2002 | Hayashi ................. 353/20 |

(Continued)

FOREIGN PATENT DOCUMENTS

WO    WO 99/46619 A    9/1999
WO    WO 00/28369 A2   5/2000

OTHER PUBLICATIONS

Mukawa, Hiroshi et al., "8.4: Distinguished Paper: A Full Color Eyewear Display using Holographic Planar Waveguides", SID Symposium Digest of Technical Papers, May 2008, pp. 89-92, vol. 39, Issue 1.

(Continued)

*Primary Examiner* — Richard Kim
*Assistant Examiner* — Kendrick Hsu
(74) *Attorney, Agent, or Firm* — Blakely Sokoloff Taylor & Zafman LLP

(57) ABSTRACT

A near-to-eye optical system includes an optically transmissive substrate having a see-through display region and a repeating pattern of diffraction elements. The repeating pattern of diffraction elements is disposed across the see-through display region of the optically transmissive substrate and organized into a reflective diffraction grating that bends and focuses computer generated image ("CGI") light impingent upon the reflective diffraction grating. The see-through display region is at least partially transmissive to external ambient light impingent upon an exterior side of the optically transmissive substrate and at least partially reflective to the CGI light impingent upon an interior side of the optically transmissive substrate opposite the exterior side.

23 Claims, 7 Drawing Sheets

(56) References Cited

U.S. PATENT DOCUMENTS

| | | |
|---|---|---|
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,829,095 B2 | 12/2004 | Amitai |
| 6,879,443 B2 | 4/2005 | Spitzer et al. |
| 7,009,771 B2 | 3/2006 | Bourdelais et al. |
| 7,021,777 B2 | 4/2006 | Amitai |
| 7,158,096 B1 | 1/2007 | Spitzer |
| 7,242,527 B2 | 7/2007 | Spitzer et al. |
| 7,346,260 B2 | 3/2008 | Arakida et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,656,585 B1 * | 2/2010 | Powell et al. ............... 359/630 |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,843,403 B2 | 11/2010 | Spitzer |
| 7,876,489 B2 | 1/2011 | Gandhi et al. |
| 7,900,068 B2 | 3/2011 | Weststrate et al. |
| 2001/0021058 A1 | 9/2001 | McClelland et al. |
| 2001/0022682 A1 | 9/2001 | McClelland et al. |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2007/0008624 A1 * | 1/2007 | Hirayama ............... 359/630 |
| 2007/0047091 A1 | 3/2007 | Spitzer et al. |
| 2007/0103388 A1 | 5/2007 | Spitzer |
| 2008/0106775 A1 | 5/2008 | Amitai |
| 2008/0151379 A1 | 6/2008 | Amitai |
| 2008/0186604 A1 | 8/2008 | Amitai |
| 2008/0198471 A1 | 8/2008 | Amitai |
| 2008/0219025 A1 | 9/2008 | Spitzer et al. |
| 2008/0247722 A1 | 10/2008 | Van Gorkom et al. |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0161383 A1 | 6/2009 | Meir et al. |
| 2009/0237804 A1 | 9/2009 | Amitai et al. |
| 2010/0046070 A1 | 2/2010 | Mukawa |
| 2010/0046219 A1 | 2/2010 | Pijlman et al. |
| 2010/0103078 A1 | 4/2010 | Mukawa et al. |
| 2010/0149073 A1 | 6/2010 | Chaum et al. |
| 2010/0171680 A1 | 7/2010 | Lapidot et al. |
| 2010/0171909 A1 * | 7/2010 | Handschy ............... 349/98 |
| 2010/0278480 A1 | 11/2010 | Vasylyev |
| 2010/0302464 A1 * | 12/2010 | Raring et al. ............... 348/744 |
| 2011/0213664 A1 | 9/2011 | Osterhout et al. |

OTHER PUBLICATIONS

Levola, Tapani, "Diffractive Optics for Virtual Reality Displays", Academic Dissertation, University of Joensuu, Department of Physics, Vaisala Laboratory, 2005, 26 pages.

Cakmakci, Ozan et al., "Head-Worn Displays: A Review", Journal of Display Technology, Sep. 2006, 20 pages, vol. 2, Issue 3.

PCT/US2012/049937; PCT International Search Report and Written Opinion of the International Searching Authority, mailed Feb. 26, 2013, 9 pages.

* cited by examiner

NEAR-TO-EYE DISPLAY WITH DIFFRACTION GRATING THAT BENDS AND FOCUSES LIGHT

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

FIG. 1 illustrates a conventional near-to-eye optical system 100 using holographic diffraction gratings 105 disposed on the backside of a waveguide structure 110. Waveguide structure 110 transports image light from an image source 115 around the front of a viewer's face to their eye 120. Since the human eye is typically incapable of focusing on objects placed within five to ten centimeters, this system requires a lens 125 interposed between the waveguide structure 110 and image source 115. Lens 125 creates a image that is virtually displaced further back from the eye by positioning image source 115 inside of the focal point of lens 125. Lens 125 is typically a bulky element.

Optical system 100 uses holographic diffraction gratings 105 disposed on the backside of waveguide structure 110 in place of conventional planar minors to in-couple and out-couple light in and out of waveguide structure 110. Diffraction gratings 105 are single phase diffraction gratings that simply reflect or redirect the light for in and out coupling purposes. These single phase diffraction gratings are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 105 requires extreme control over manufacturing tolerances, which is often difficult and costly. Finally, optical system 100 suffers from a limited field of view, which is constrained by the width of waveguide structure 110 which guides the light between the in-coupling and out-coupling diffraction gratings 105. The optical width can be marginally increased by using a high index material to improve field of view, but ultimately the physical dimensions of waveguide structure 110 provide the greater control over field of view. Increasing the width of waveguide structure 110 results in a bulky, uncomfortably heavy and awkward looking eyepiece.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method of operation for a head mounted display ("HMD") eyepiece having a diffraction grating that bends and focuses light are described below. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
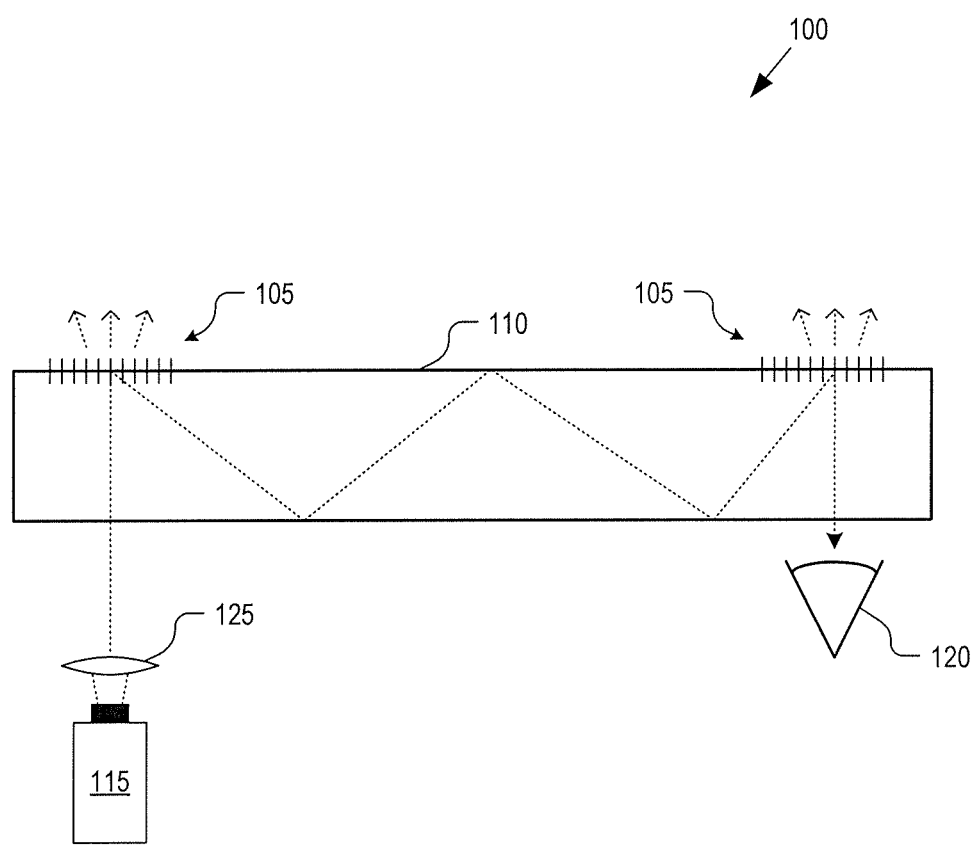
FIG. 1 (PRIOR ART) illustrates a conventional near-to-eye optical system using single phase in-coupling and out-coupling diffraction gratings for light bending.
Figure 2:
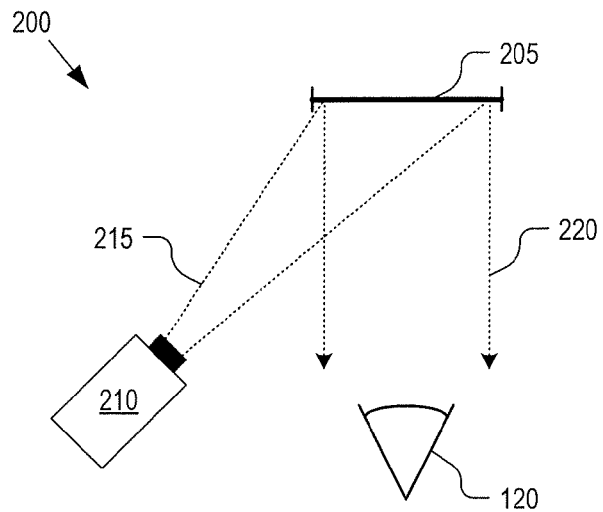
FIG. 2 is a functional block diagram illustrating a near-to-eye optical system using a diffraction grating that bends and focuses light, in accordance with an embodiment of the disclosure.

FIG. 2 is a functional block diagram illustrating a near-to-eye optical system 200 using a diffraction grating that bends and focuses light, in accordance with an embodiment of the disclosure. The illustrated embodiment of near-to-eye optical system 200 includes a diffraction grating 205 and a light engine 210.

Light engine 210 may be implemented with a variety of different display technologies (e.g., LCoS, LCD, digital micro-minor, MEMS scanning mirror, quantum dot array, OLED, etc.), but should output light having a narrow wavelength band, such as output by a laser source (e.g., laser diode). Light engine 210 may be coupled to a controller, such as a computer generated image ("CGI") engine, to output CGI light 215. Diffraction grating 205 is fabricated of a repeating pattern of reflective diffraction elements organized into a reflective diffraction grating that both reflects (e.g., bends) light and focuses (e.g., magnifies) light. Thus, as illustrated in FIG. 2, CGI light 215 emitted from light engine 210 has a divergent light cone and obliquely impinges upon diffraction grating 205. The reflected CGI light 220 is focused (e.g., the divergence of each pixel within the CGI light 215 is altered) and CGI light 220 is reflected along a different trajectory than CGI light 215. Thus, diffraction grating 205 both bends light and focuses the light. The reflection characteristic of diffraction grating 205 enables it to be used to transport CGI light 215 from a peripheral location to in front of eye 120. The focusing characteristics of diffraction grating 205 enables it to be used in a near-to-eye configuration (e.g., HMD) without need for additional bulking external focusing optics. If diffraction gating 205 is embedded or otherwise disposed in or on a substantially transparent substrate, it can be tailored for use in see-through displays.

Figure 3:
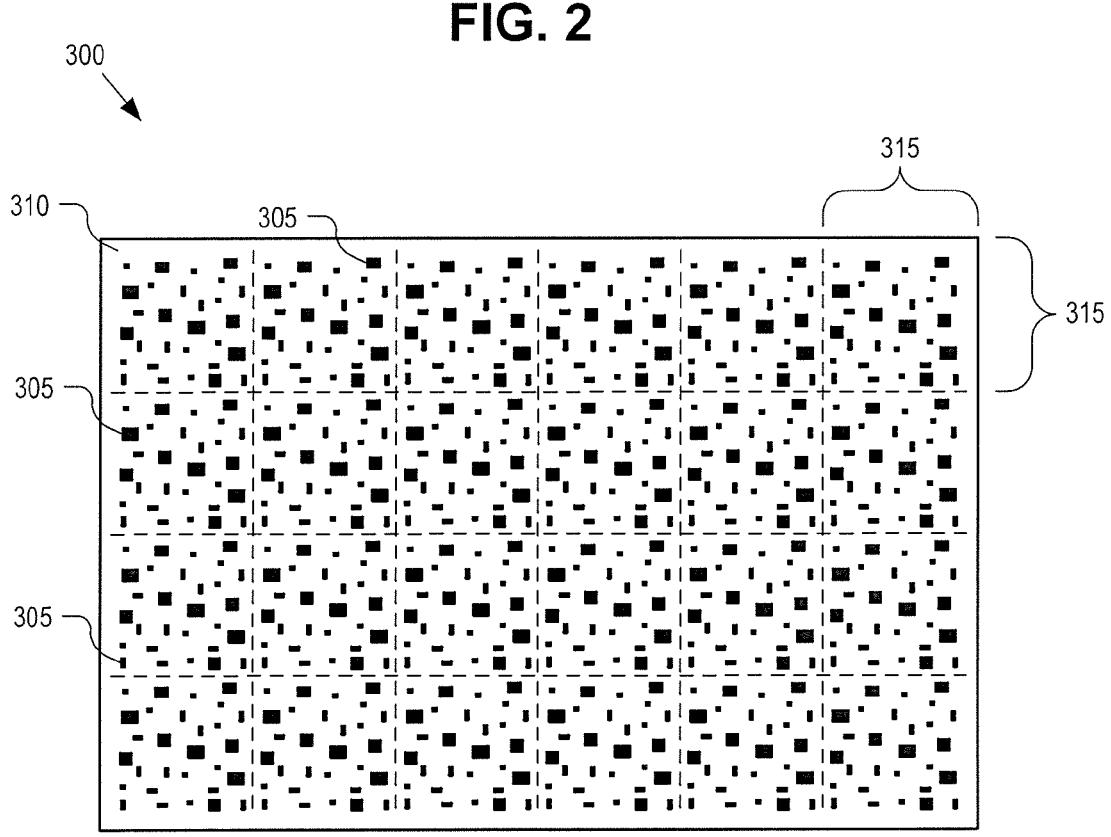
FIG. 3 illustrates an example repeating pattern of diffraction elements organized into a reflective diffraction grating that reflects and focuses light, in accordance with an embodiment of the disclosure.

FIG. 3 illustrates an example diffraction grating 300 that reflects and focuses light, in accordance with an embodiment of the disclosure. Diffraction grating 300 is one possible implementation of diffraction grating 205. The illustrated embodiment of diffraction grating 300 includes reflective diffraction elements 305 disposed in or on an optically transmissive substrate 310. Diffraction grating 300 does not merely generate a holographic image in response to illumination by imageless lamp light; rather, diffraction grating 300 preserves the image illuminated onto its surface, while both reflecting and magnifying the image (e.g., CGI light 215).

Optically transmissive substrate 310 may be fabricated of a variety of substantially or partially transparent materials, such as, glass, quartz, acrylic, clear plastic, PMMA, ZEONEX—E48R, etc. In one embodiment, optically transmissive substrate 310 may be a flat planar surface or a curved surface. A curved surface embodiment may facilitate using the optically transmissive substrate 310 as an eyepiece for a HMD or eyeglass frame. The individual diffraction elements 305 are three-dimensional structures formed of reflective material or coated with reflective material (e.g., metal, dichroic film, etc.) and separated by intervening gaps of optically transmissive substrate 310. In one embodiment, the reflective material is a partially reflective (e.g., 50% reflective) coating of aluminum or silver. The partial reflectivity of these structures permits sufficient external ambient light to pass through the backside of diffraction grating 300 for a see-through display. Alternatively, the reflective material may be a dichroic angle selective multi-layer surface that is substantially transparent to light that strikes substantially normal to the surface of optically transmissive substrate 310 while being substantially reflective to CGI light 215 that impinges upon diffraction grating 300 at a sufficiently oblique angle. Although FIG. 3 illustrates that diffraction elements 305 have rectangular plan view profiles, they may in fact be designed with other plan view profile shapes (e.g., circular, triangular, irregular, etc.).

As discussed above, since diffraction grating 300 does not create a new image when illuminated with light, but rather reflects and focuses an existing image. Diffraction grating 300 includes a repeating pattern 315 across its surface to perform the combined light bending and light focusing functions. In one embodiment, repeating pattern 315 may repeat on a per pixel basis with a one-to-one correspondence between image pixels of CGI light 215 and instances of repeating pattern 315. In other embodiments, pattern 315 may repeat with an even finer granularity than just a per pixel basis. For example, while the smallest repeating pattern within diffraction grating 300 may be smaller than the illumination spot size of a given image pixel, in some embodiments, diffraction grating 300 may still repeat on a per pixel basis with a one-to-one correspondence between instances of pattern 315 and a given image pixel.

Figure 4:
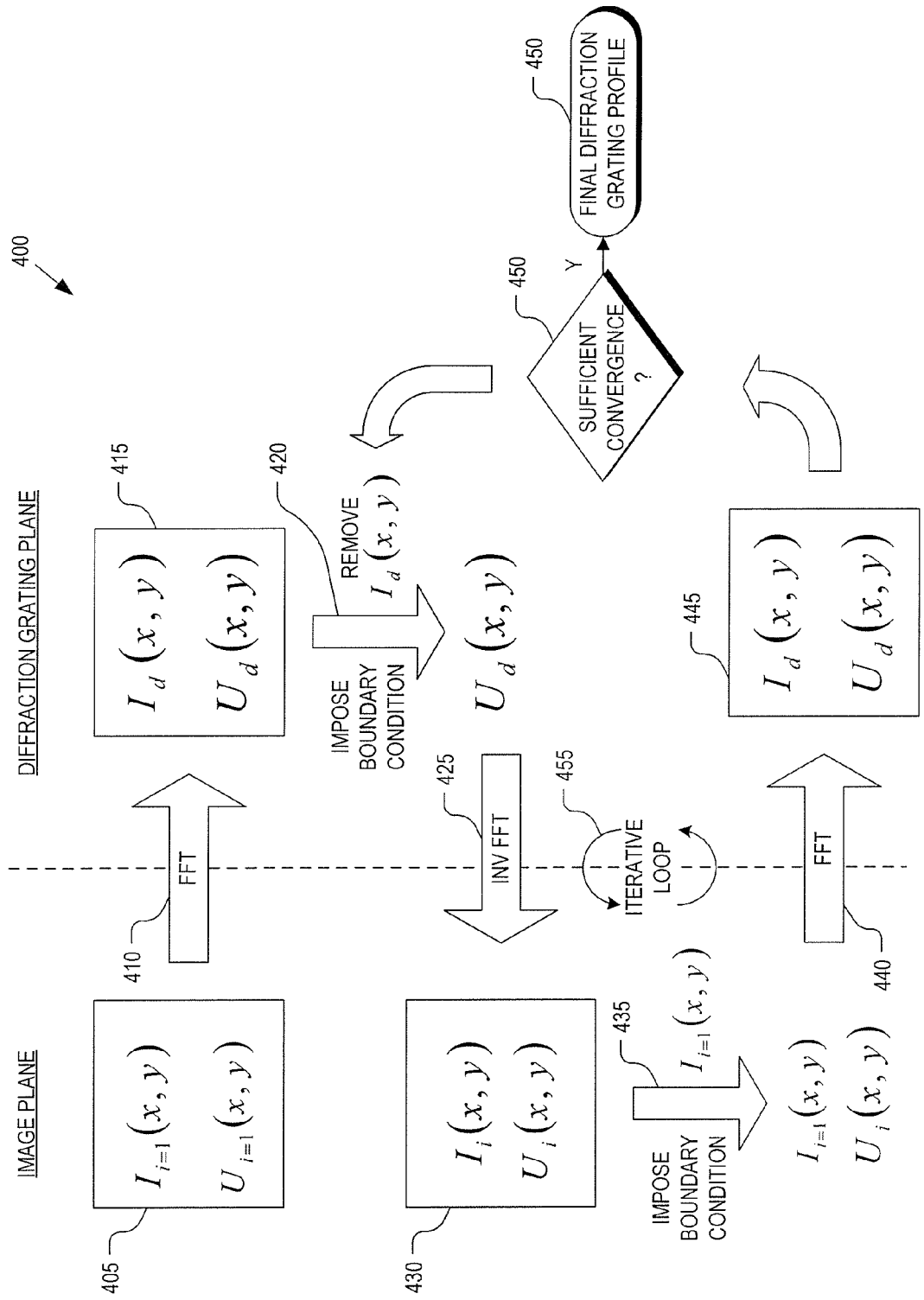
FIG. 4 is a flow chart illustrating an iterative Fast Fourier Transform process for generating a profile function describing a diffraction grating that reflects and focuses light, in accordance with an embodiment of the disclosure.

FIG. 4 is a flow chart 400 illustrating an iterative Fast Fourier Transform ("FFT") process for generating a profile function describing the physical profile of a diffraction grating that both bends and focuses light, in accordance with an embodiment of the disclosure. The illustrated process may be used to fabricate diffracting gratings 200 or 300 using the Gerchberg-Saxton iterative algorithm. The process begins by defining a desired intensity distribution function $[I_{i=1}(x,y)]$ and an initial phase function $[U_{i=1}(x,y)]$ at the image plane (block 405). The image plane is the position where CGI light 220 is to deliver an in-focus image to eye 120. An FFT is then applied to the desired intensity distribution function and the initial phase function (block 410) to obtain an intensity distribution function $[I_d(x,y)]$ and a phase function $[U_d(x,y)]$ at the diffraction grating plane (block 415). At block 415, the phase function $[U_d(x,y)]$ represents a first iterative approximation of the physical profile of the diffraction grating. However, to improve upon the approximation, the phase function $[U_d(x,y)]$ is iterated upon. Before the next iteration, a boundary condition (block 420) is imposed whereby the intensity distribution function $[I_d(x,y)]$ is dropped and only the phase function $[U_d(x,y)]$ is used. An inverse FFT is then applied to the phase function $[U_d(x,y)]$ (block 425) to obtain the next iteration of the intensity distribution function $[I_i(x,y)]$ and phase function $[U_i(x,y)]$ back at the image plane (block 430). Before applying the next FFT iteration, boundary conditions are again imposed (block 435) whereby the original desired intensity distribution function $[I_{i=1}(x,y)]$ along with the recently iterated phase function $[U_i(x,y)]$ are again run through the FFT (block 440) to obtain the next iteration of the intensity distribution function $[I_d(x,y)]$ and the phase function $[U_d(x,y)]$ at the diffraction grating plane (block 445). The boundary conditions at the diffraction grating plane are again imposed at block 420 and iterative loop 455 executed many times (e.g., hundreds of times) until the phase function $[U_d(x,y)]$ at the diffraction grating plane sufficiently converges on a solution (decision block 450). At this point, the phase function $[U_d(x,y)]$ sufficiently defines the diffraction grating profile (block 450).

Figure 5:
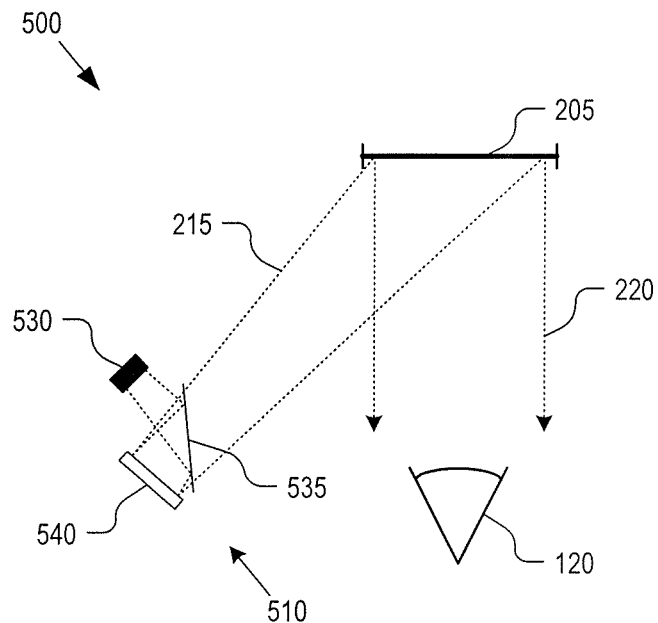
FIG. 5 is a functional block diagram illustrating a near-to-eye optical system having a light engine implemented with a liquid crystal on silicon display panel, in accordance with an embodiment of the disclosure.

FIG. 5 is a functional block diagram illustrating a near-to-eye optical system 500 having a light engine implemented with a liquid crystal on silicon ("LCoS") display panel, in accordance with an embodiment of the disclosure. Optical system 500 is one possible implementation of optical system 200. Optical system 500 includes a light engine 510 implemented using a laser lamp source 530, a polarizing beam splitter ("PBS") 535, and an LCoS panel 540. Laser lamp source 530 may be implemented using a variety of laser source technologies, including a laser diode. In one embodiment, laser lamp source 530 outputs polarized light, although in other embodiments, the output lamp light may be unpolarized.

During operation, the output lamp light (or a single polarization thereof) is reflected off PBS 535 onto the surface of LCoS panel 540. LCoS panel 540 modulates the CGI onto the lamp light to generate the CGI light 215. In so doing, the CGI light 215 has its polarization rotated by 90 degrees, when then passes through PBS 535 with high efficiency. As discussed above, CGI light 215 is bent and focused by diffraction grating 205 onto eye 120.

Figure 6:
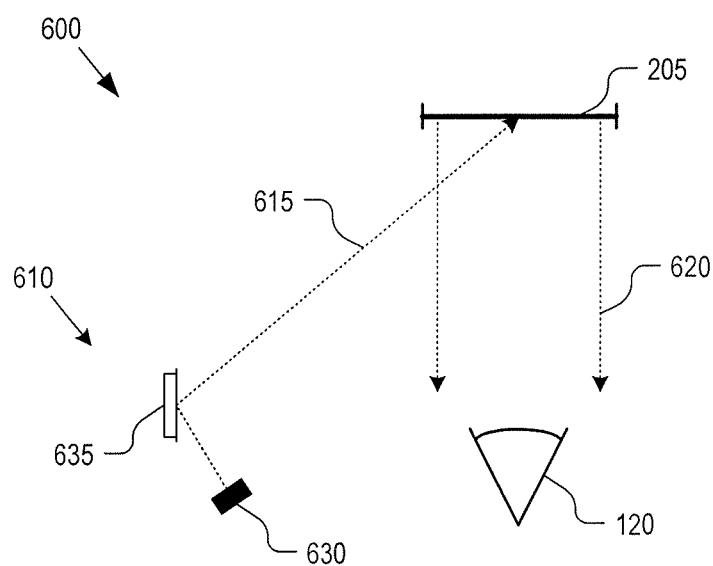
FIG. 6 is a functional block diagram illustrating a near-to-eye optical system having a light engine implemented with a micro-electro-mechanical-system ("MEMS") scanning mirror, in accordance with an embodiment of the disclosure.

FIG. 6 is a functional block diagram illustrating a near-to-eye optical system 600 having a light engine implemented with a micro-electro-mechanical-system ("MEMS") scanning mirror. Optical system 600 is one possible implementation of optical system 200. Optical system 600 includes a light engine 610 implemented using a laser lamp source 630 and MEMS scanning minor 635. Laser lamp source 630 may be implemented using a variety of laser source technologies, including a laser diode.

During operation, laser lamp source 630 outputs a single pixel beam 615 onto MEMS scanning minor 635, which is positioned to reflect and raster scan single pixel beam 615 across diffraction grating 205 to generate the overall CGI light 620 to eye 120. Although only a single pixel is displayed to eye 120 at a time, the slow response time of the human eye results in the user perceiving the overall CGI light 620. As discussed above, in one embodiment, the repeating pattern on diffraction grating 205 repeats on a per pixel basis with a one-to-one correspondence between image pixels of CGI light 615. In one embodiment, the diffraction grating pattern may change on a per pixel basis to account for angle differences of the impinging CGI light 615 due to the raster scanning technique.

Figure 7:
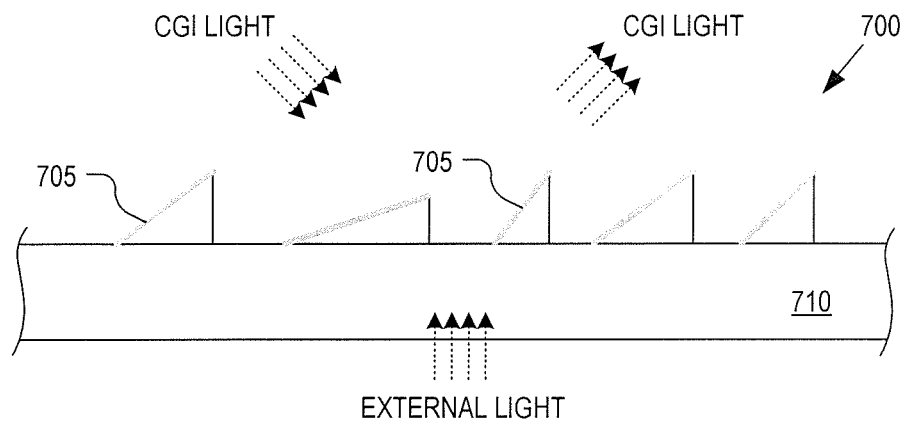
FIG. 7 is an example cross-sectional view of diffraction elements having a reflective coating, in accordance with an embodiment of the disclosure.

FIG. 7 is an example cross-sectional side view of diffraction elements 700 having a reflective coating 705, in accordance with an embodiment of the disclosure. Diffraction elements 700 represent one possible implementation of diffraction elements 305 illustrated in FIG. 3. The illustrated embodiment of diffraction elements 700 are raised structures disposed over an optically transparent substrate 710. Diffraction elements 700 include reflective coating 705 thereby forming a reflective diffraction grating. Reflective coating 705 may be implemented with a variety of different reflective materials, such as metal (e.g., aluminum, silver, etc.). In one embodiment, the reflective coating 705 may be fabricated of a partially reflective material (e.g., 50% reflective coating of aluminum). The partially reflective coating can improve the transmittance of external light through the diffraction grating for use in see-through displays.

Diffraction elements 700 may be fabricated onto optically transparent substrate 710 using a variety of techniques. For example, diffraction elements 700 can be directly made of SU8 photo-resist on optically transparent substrate 710 itself, and laser lithography or angled exposure to UV light may be used to achieve the oblique angles of the reflective surfaces. Alternatively, diffraction elements 700 can be fabricated by patterning the surface of optically transparent substrate 710 (e.g., glass substrate) using photo-resist (e.g., SU8) and then etching the diffraction elements 700 into optically transparent substrate 710. Etching techniques may use both positive or negative photo-resists along with appropriate lithography techniques.

Figure 8:
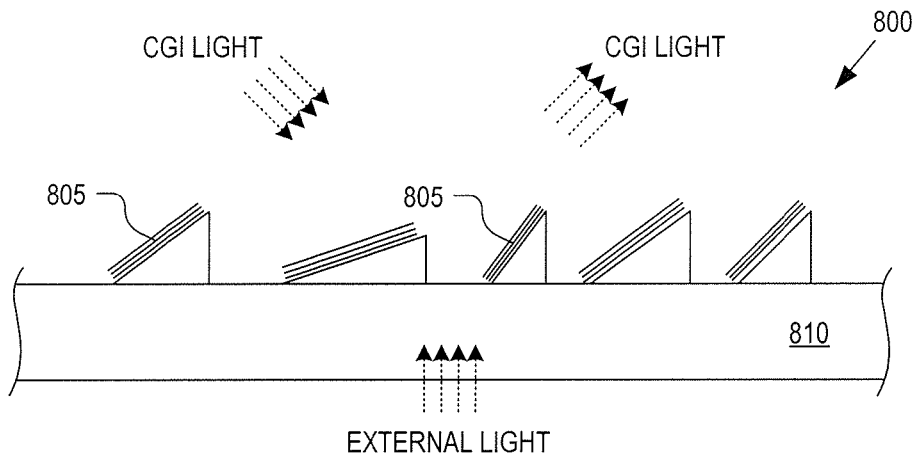
FIG. 8 is an example cross-sectional view of diffraction elements having a dichroic angle selective multi-layer coating, in accordance with an embodiment of the disclosure.

FIG. 8 is an example cross-sectional view of diffraction elements 800 having a dichroic angle selective multi-layer coating 805, in accordance with an embodiment of the disclosure. Diffraction elements 800 may be fabricated in a similar manner to diffraction elements 700, except that the oblique or slanted grating surfaces are coated with dichroic angle selective material. The dichroic material can be selected such that coating 805 is reflective to obliquely incident CGI light while being substantially transparent to external light having a substantially normal incidence to optically transmissive substrate 810.

Figure 9:
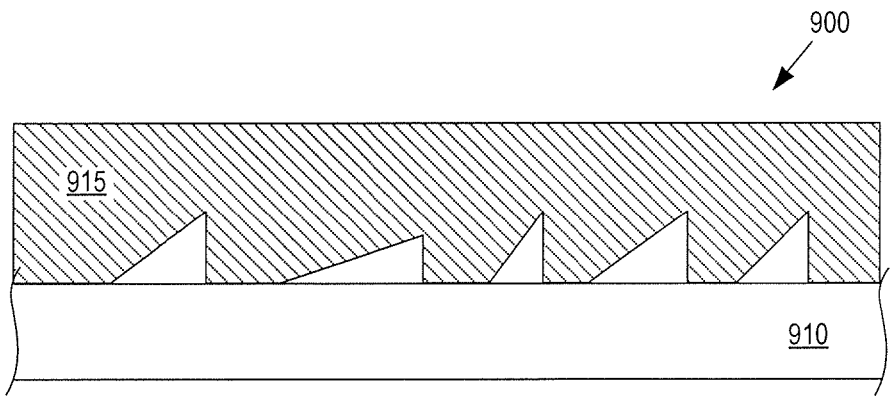
FIG. 9 illustrates a technique of electroplating to fabricate a master mold for forming diffraction gratings having light bending and light focusing properties, in accordance with an embodiment of the disclosure.

FIG. 9 illustrates a technique of electroplating to fabricate a master mold for forming a diffraction grating having light bending and light focusing properties, in accordance with an embodiment of the disclosure. In the illustrated embodiment, diffraction structures 900 are formed on the surface of substrate 910. The techniques described in connection with FIG. 7 may be used. Alternatively, substrate 910 may be fabricated of a semiconductor material (e.g., silicon, gallium-arsenide, etc.) and etched using conventional techniques to create the raised diffraction grating structures 900 on substrate 910. Subsequently, an electroplating layer 915 may be formed over the surface and then separated from substrate 910 to form a master mold. The master mold may then be used to fabricate eyepieces that have the grating structure impressed into a surface. For example, plastic injection molding techniques may be used.

Figure 10:
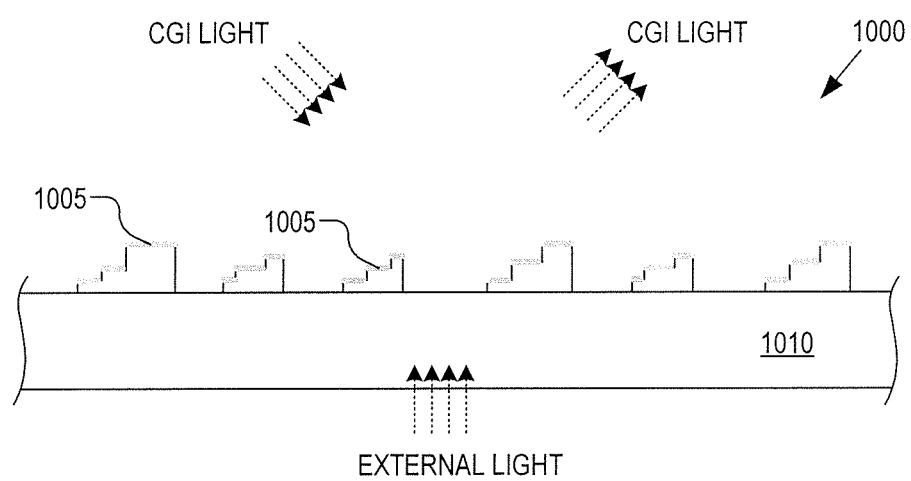
FIG. 10 is an example cross-sectional view of discrete multiphase diffraction elements, in accordance with an embodiment of the disclosure.

FIG. 10 is an example cross-sectional view representation of discrete multiphase diffraction elements 1000, in accordance with an embodiment of the disclosure. Multiphase diffraction elements 1000 have a discrete staircase-like side profile. Similar to the other diffraction elements disclosed above, multiphase diffraction elements 1000 are coated with a reflective material 1005 and disposed over an optically transmissive substrate 1010. The use of a discrete multiphase diffraction grating eases the manufacturing of the diffraction grating relative to the smooth analog oblique surfaces illustrated in FIGS. 7, 8, and 9; however, the multiphase diffraction grating provides greater optical efficiency versus a diffraction grating fabricated of discrete single step (e.g., rectangular cross-sections) diffraction elements. Although FIG. 10 illustrates diffraction elements 1000 as each having three phases, diffraction elements having two or more discrete phases may be used.

Figure 11:
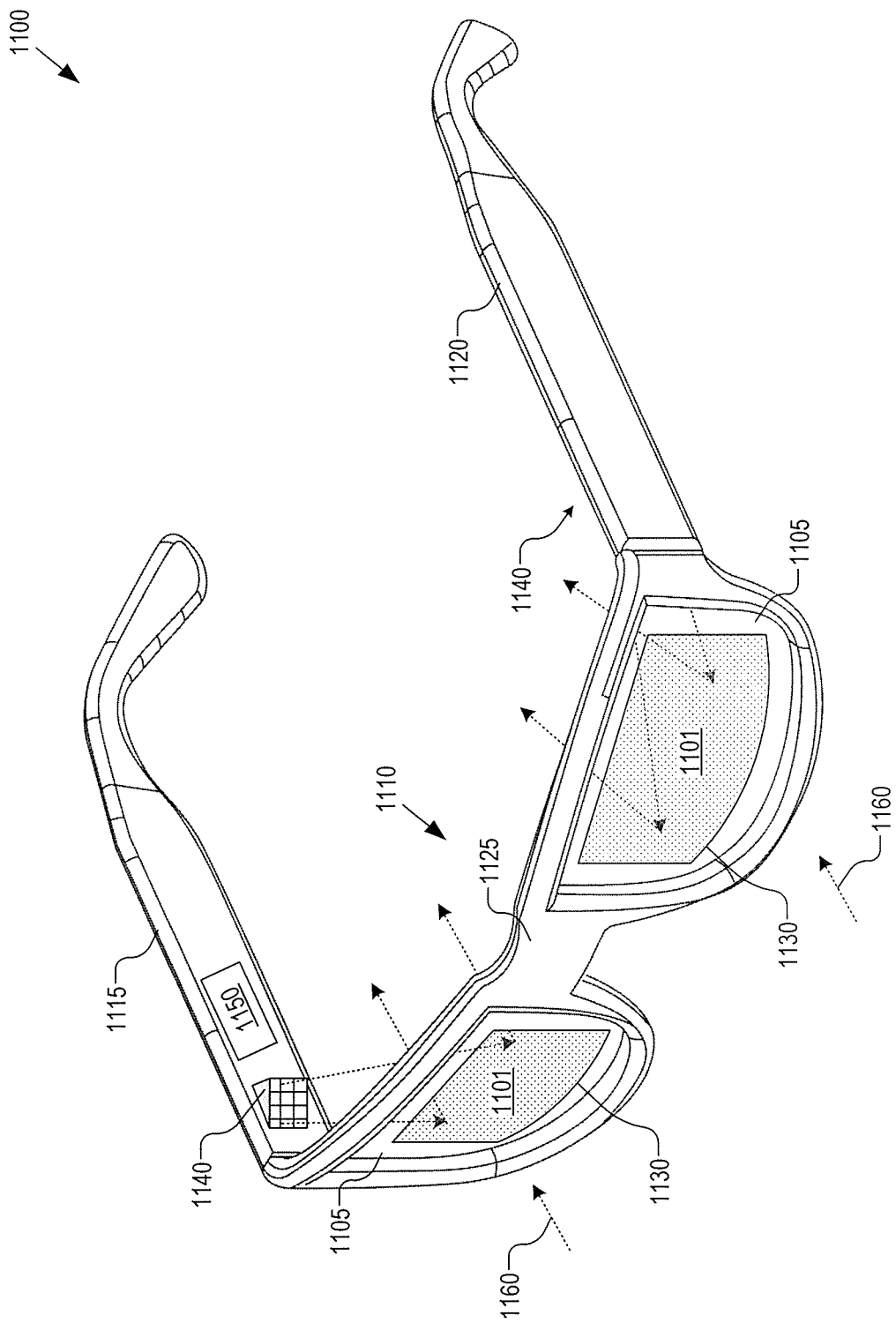
FIG. 11 is a demonstrative binocular head mounted display using a reflective diffraction grating, in accordance with an embodiment of the disclosure.

FIG. 11 is a demonstrative binocular HMD 1100 using reflective diffraction gratings 1101 each disposed on a corresponding eyepiece 1105, in accordance with an embodiment of the disclosure. Each reflective diffraction grating 1101 may be implemented with embodiments of diffraction gratings 205 or 300. Eyepieces 1105 are mounted to a frame assembly, which includes a frontal member 1110, left temple extension arm 1115, and right temple extension arm 1120. Although FIG. 11 illustrates a binocular embodiment, HMD 1100 may also be implemented as a monocular HMD with only a single eyepiece and single reflective diffraction grating.

The two eyepieces 1105 are secured into an eyeglass arrangement that can be worn on the head of a user. The left and right temple extensions arms 1110 and 1115 rest over the user's ears while a nose bridge 1125 rests over the user's nose. The frame assembly is shaped and sized to position see-through display regions 1130 within eyepieces 1105 in front of corresponding eyes 120. Of course, other frame assemblies having other shapes may be used (e.g., a visor with ear arms and a nose bridge support, a single contiguous headset member, a headband, goggles type eyewear, etc.).

HMD 1100 further includes light engines 1140 disposed on the inside surface of temple extension arms 1115 and 1120 and oriented to directly illuminate see-through display regions 1130 with CGI light through free space air. A controller 1150 (e.g., baseband management controller, graphic engine, etc.) and various other electronics may also be housed within temple extension arms 1115, 1120, or frontal member 1110.

The illustrated embodiment of HMD 1100 is capable of displaying an augmented reality to the user. The viewing region of each eyepiece permits the user to see a real world image via external scene light 1160. Left and right (binocular embodiment) CGI light may be generated by one or two CGI engines within controller 1150 coupled to a respective light engine 1140. The CGI light may be seen by the user as virtual images superimposed over the real world as an augmented reality.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display ("HMD") for displaying computer generated image ("CGI") light to a user, the HMD comprising:
    a frame assembly to support the HMD for wearing on a head of the user;
    an eyepiece secured to the frame assembly and positioned to form a see-through display, the eyepiece including:
        an optically transmissive substrate; and
        a repeating pattern of diffraction elements disposed across a viewing region of the optically transmissive substrate, wherein the repeating pattern of diffraction elements is a reflective diffraction grating that both bends the CGI light and focuses the CGI light with magnification, wherein the repeating pattern of diffraction elements is a two-dimensional ("2D") pattern of three-dimensional ("3D") diffraction elements, and wherein the 2D pattern repeats horizontally and vertically across the viewing region; and
    a light engine mounted to the frame assembly and oriented to illuminate the reflective diffraction grating with the CGI light.

2. The HMD of claim 1, wherein the repeating pattern of diffraction elements is organized into the reflective diffraction grating that both bends and magnifies the CGI light to bring the CGI light into focus for a near-to-eye display.

3. The HMD of claim 1, wherein the frame assembly includes:
    a frontal member to support the eyepiece; and
    temple extension arms coupled to the frontal member and extending back towards ears of the user when the HMD is worn by the user, wherein the light engine is mounted to one of the temple extension arms.

4. The HMD of claim 3, wherein the light engine is positioned to directly illuminate the reflective diffraction grating through free space air without intervening waveguiding optics.

5. The HMD of claim 1, wherein the repeating pattern of diffraction elements repeats on a per pixel basis with a one-to-one correspondence between pixels of the light engine and instances of the repeating pattern.

6. The HMD of claim 1, wherein the diffraction elements each comprise a reflective surface and the diffraction elements are separated from adjacent diffraction elements by intervening gaps on the optically transmissive substrate.

7. The HMD of claim 6, wherein the diffraction elements each comprise structures having the reflective surface oriented obliquely to a surface of the optically transmissive substrate.

8. The HMD of claim 6, wherein the diffraction elements each comprise multi-phase structures having a staircase profile coated with the reflective surface.

9. The HMD of claim 6, wherein the reflective surface comprises a partially reflective metal coating.

10. The HMD of claim 6, wherein the reflective surface comprises a dichroic angle selective multi-layer surface that is substantially reflective to light incident along a first angle from which the CGI light originates and is substantially transparent to external light incident along a second angle substantially normal to a surface of the optically transmissive substrate.

11. The HMD of claim 1, wherein the light engine comprises:
    a laser diode lamp to output lamp light;
    a liquid crystal on silicon ("LCoS") panel to reflect the CGI light in response to illumination by the lamp light; and
    a polarizing beam splitter ("PBS") positioned between the laser diode lamp and the LCoS panel to redirect the lamp light onto the LCoS panel and to pass the CGI light to the eyepiece.

12. The HMD of claim 1, wherein the light engine comprises:
    a laser diode source to controllably output a single pixel beam; and
    a micro-electro-mechanical-system ("MEMS") scanning mirror positioned to reflect and raster scan the single pixel beam across the reflective diffraction grating to form the CGI light.

13. The HMD of claim 1, wherein the optically transmissive substrate comprises a substrate having a curved surface.

14. An apparatus for head mounted display, the apparatus comprising:

an optically transmissive substrate having a see-through display region; and a repeating pattern of diffraction elements disposed across the see-through display region of the optically transmissive substrate, wherein the repeating pattern of diffraction elements is a reflective diffraction grating that reflects and magnifies computer generated image ("CGI") light impingent upon the reflective diffraction grating, and wherein the repeating pattern of diffraction elements is a two-dimensional ("2D") pattern of three-dimensional ("3D") diffraction elements, wherein the 2D pattern repeats horizontally and vertically across the viewing region, wherein the see-through display region is at least partially transmissive to external ambient light impingent upon an exterior side of the optically transmissive substrate and at least partially reflective to the CGI light impingent upon an interior side of the optically transmissive substrate opposite the exterior side.

15. The apparatus of claim 14, wherein the repeating pattern of diffraction elements repeats on a per pixel basis with a one-to-one correspondence between image pixels of the CGI light and instances of the repeating pattern.

16. The apparatus of claim 14, wherein the diffraction elements each comprise a reflective surface and the diffraction elements are separated from adjacent diffraction elements by intervening gaps on the optically transmissive substrate.

17. The apparatus of claim 16, wherein the diffraction elements each comprise structures having the reflective surface oriented obliquely to a surface of the optically transmissive substrate.

18. The apparatus of claim 16, wherein the diffraction elements each comprise discrete multi-phase structures having a staircase profile coated with the reflective surface.

19. The apparatus of claim 16, wherein the reflective surface comprises a partially reflective metal coating.

20. The apparatus of claim 16, wherein the reflective surface comprises a dichroic angle selective multi-layer surface that is substantially reflective to light incident along a first angle from which the CGI light originates and is substantially transparent to external light incident along a second angle substantially normal to a surface of the optically transmissive substrate.

21. The apparatus of claim 14, further comprising:

a frame assembly to support the optically transmissive substrate for wearing on a head of a user; and a light engine mounted to the frame assembly and oriented to illuminate the reflective diffraction grating with the CGI light from the interior side.

22. The apparatus of claim 21, wherein the light engine comprises:

a laser diode lamp to output lamp light;

a liquid crystal on silicon ("LCoS") panel to reflect the CGI light in response to illumination by the lamp light; and a polarizing beam splitter ("PBS") positioned between the laser diode lamp and the LCoS panel to redirect the lamp light onto the LCoS panel and to pass the CGI light to the see-through display region.

23. The apparatus of claim 21, wherein the light engine comprises:

a laser diode source to controllably output a single pixel beam; and a micro-electro-mechanical-system ("MEMS") scanning mirror positioned to reflect and raster scan the single pixel beam across the reflective diffraction grating to form the CGI light.

\* \* \* \* \*